J. M. DINIESE.
CAR COUPLING.
APPLICATION FILED JULY 3, 1917.
1,297,808. Patented Mar. 18, 1919.
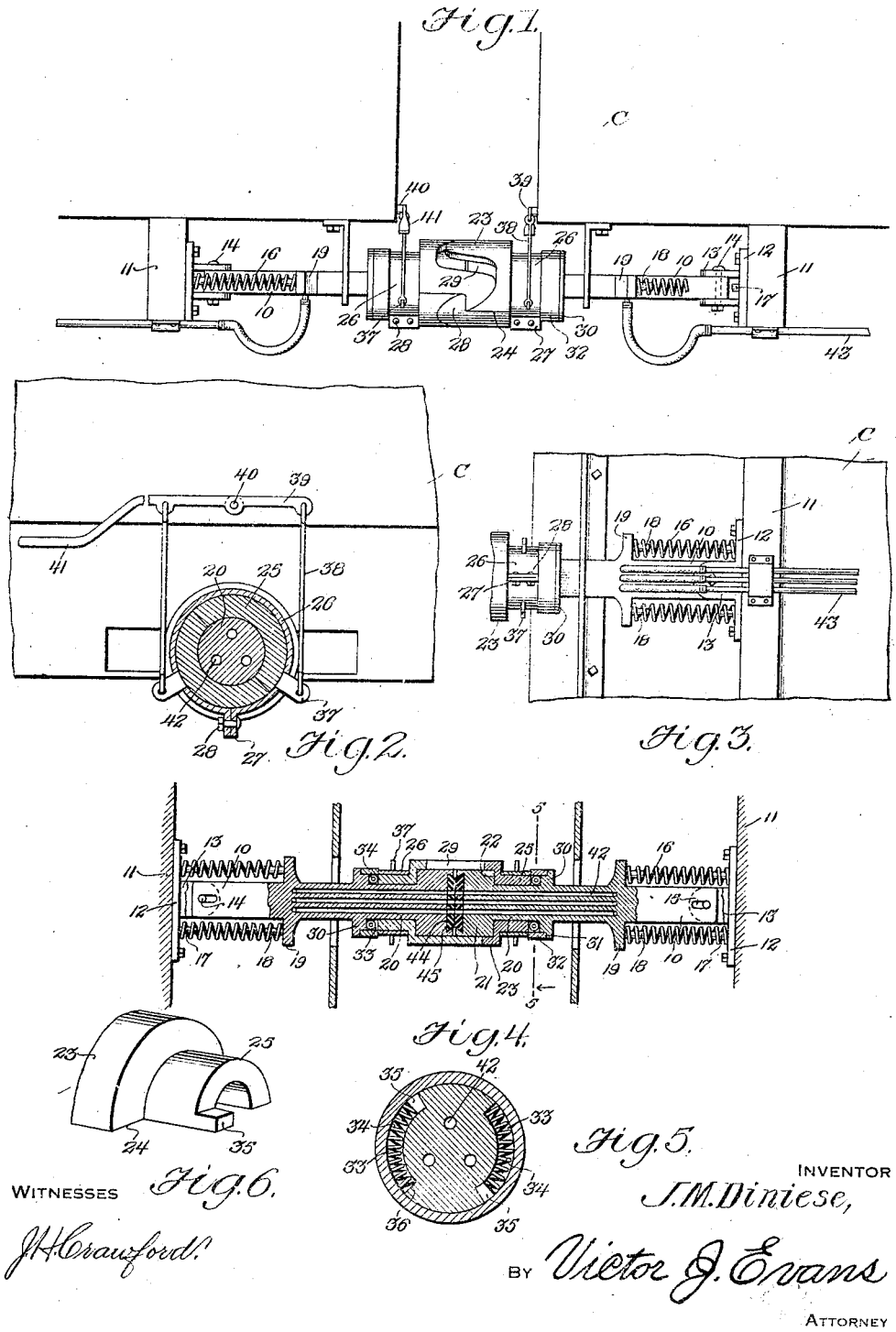
WITNESSES
J H Crawford
INVENTOR
J. M. Diniese,
BY Victor J. Evans
ATTORNEY

UNITED STATES PATENT OFFICE.

JOHN M. DINIESE, OF SOUTH BETHLEHEM, PENNSYLVANIA.

CAR-COUPLING.

1,297,808.  Specification of Letters Patent.  Patented Mar. 18, 1919.

Application filed July 3, 1917. Serial No. 178,426.

*To all whom it may concern:*

Be it known that I, JOHN M. DINIESE, a citizen of the United States, residing at South Bethlehem, in the county of Northampton and State of Pennsylvania, have invented new and useful Improvements in Car-Couplings, of which the following is a specification.

This invention relates to couplings and is designed to provide means wherein the heat or steam line coupling, the air brake coupling and the coupling for the air signal may be all combined with a car coupling.

The invention also contemplates means whereby the coupling and uncoupling of all of the above mentioned elements will be accomplished simultaneously, the cars being so arranged that the coupling members of the various elements will register when the coupling is connected, provision being made for effecting an air and steam tight joint of all of the members.

With these and other objects in view, the invention consists of the following novel combination and arrangement of parts, hereinafter more fully pointed out and illustrated in the accompanying drawings, in which—

Figure 1 is a side elevation of the invention shown applied, the parts being shown in engaged position;

Fig. 2 is a transverse sectional view through the coupling head;

Fig. 3 is a bottom plan view illustrating the pivotal spring mountings of the draw bar;

Fig. 4 is a central horizontal sectional view of the subject matter of Fig. 1;

Fig. 5 is a cross-sectional view on the line 5—5 of Fig. 4; and

Fig. 6 is a detail perspective view of one-half of one of the coupling sleeves.

In the drawings, the reference character 10 designates a draw bar, which is designed to be pivotally secured beneath the bottom of a car C, upon a stationary structure 11 provided for that purpose, the pivotal connection being made through the medium of a bracket 12, which is formed with spaced ears 13, which receive between them the ends of the draw bar 10, the pivot pin of which is shown at 14. This pin is passed through the ears 13 and operates in a slot 15, so as to provide for a limited longitudinal movement of the bar.

In order to hold the draw bar normally in alinement with the car, there is provided upon each side of the same a spring 16, each end of which engages a pin 17 carried by the bracket 12 and the opposite end a pin 18 carried by lateral extensions 19 formed upon or secured to each side of the bar 10. The inner extremity of this bar is rounded as shown at 20, the purpose of which is apparent.

The opposite end of the draw bar 10 is enlarged as shown at 21 to provide a coupling head, this head being preferably circular in cross-section, the enlargement forming a shoulder 22.

Secured upon this head is a sleeve 23, which is split longitudinally as shown at 24, providing two half sections which are adapted to be placed around the enlargement 21, the sleeve being reduced as shown at 25, which reduced portion lies against the shoulder 2 so as to provide a swiveled connection between the sleeve and the enlargement 21. The sleeve 23 is held in position by means of a clamping band 26, the split ends 27 of which are secured together by means of bolts 28, so that the two half sections of the sleeeve 23 may be placed around the enlargement and the reduced portion 25 behind the shoulder 22, the band 26 securely holding the parts in position.

The sleeve 23 is formed with a plurality of cam hooks 28, recesses 29 being formed between each of these hooks for the purpose of receiving therein similar hooks of the opposite coupling.

The draw bar 10 is provided with an annular flange 30, which is circumferentially reduced to provide a seat 31, within which is placed a ring 32, the flange 30 being spaced from the shoulder 22. The draw bar is cut away upon opposite sides to provide diametrically disposed enlargements, between which are formed recesses 33, within which are seated springs 34. Shoulders 36 are thus formed for one end of each of the springs, which are circumferentially disposed upon diametrically opposite sides of the draw bar, which at this point is of circular formation.

Secured to each of the half sections of the sleeve 23 is a rearwardly projecting lug 35, which is adapted to extend within each of the recesses 33 in a manner to position the spring 34 between this lug and the shoulder 36, which as shown in Fig. 5 is of arcuate formation.

Secured to the sleeve 23 is a lug or projection 37, which is formed with an aperture for connection with the link 38, there being one of these lugs and links located upon each side of the sleeve. The upper ends of the links 38 are pivoted together upon the operating lever 39 which is pivoted at 40 to the car C, a handle 41 being provided for the purpose of operating the sleeve.

It will be therefore seen that when moving the lever 39 upon the pivot 40, the sleeve will be rotated around the enlargement 21, against the influence of the springs 34, these springs normally tending to maintain the cam hooks 28 in position for automatic operation.

Located within the draw bar 10 is a series of passages 42, preferably three in number, one of these passages being designed to be connected to a train line of air brakes, and another of the passages 42 being designed to be connected to the steam line, while the third passage is designed for connection with the air signal line, through the medium of the coupling pipes 43. These passages open through the outer end of the enlargement 21, of the coupling head, which is provided with a seat 24, within which is secured a gasket 45, provided with openings which register with the openings 42.

While there has been described a single coupling, it is of course understood that the coupling includes a pair of such couplings, the opposite coupling being of similar construction. In the operation of the coupling, the cars are brought together in the usual manner, the cam hooks of the opposite sleeves 23 engaging and the said sleeves rotating upon their respective coupling heads, so that the hooks will be automatically engaged and as the passages 43 in the opposite coupling registers, communication will be established between these passages, the gaskets 45 providing for a tight joint. When it is desired to disconnect the coupling, the lever 39 is rocked a sufficient distance to disengage the cam hooks 28.

Having described the invention, what is claimed is:

In a car coupling, a draw bar, an enlarged cylindrical head carried by the outer end of the said draw bar, an annular flange surrounding the draw bar and spaced from the inner end of said head to provide an annular groove, a coupling member rotatable upon said head, engaging hooks projecting from said coupling member for engagement with the opposite coupling, a reduced sleeve projecting from the opposite end of the coupling member for rotatable engagement with the annular groove, said sleeve terminating short of the annular flange, diametrically located extensions formed upon each side of the draw bar within the annular groove to provide oppositely located recesses, diametrically located lugs extending from the end of the sleeve within the recesses, circumferentially disposed springs located upon opposite sides of the draw bar within each of the recesses and operating between said lugs and shoulders formed by the extensions upon each side of the draw bar for yieldingly maintaining the hooks in position for engagement with the hooks of the opposite coupling member and a ring surrounding the annular flange and extending over the end of the sleeve to provide a housing for the springs and lugs.

In testimony whereof I affix my signature.

JOHN M. DINIESE.

Copies of this patent may be obtained for five cents each, by addressing the "Commissioner of Patents, Washington, D. C."